United States Patent [19]

Charpentier et al.

[11] Patent Number: 4,551,682

[45] Date of Patent: Nov. 5, 1985

[54] DIGITAL SINE-COSINE GENERATOR

[75] Inventors: Albert J. Charpentier, Hatfield; James W. Redfield, Pottstown; David W. DiOrio, Easton, all of Pa.

[73] Assignee: Commodore Business Machines, Inc., West Chester, Pa.

[21] Appl. No.: 455,041

[22] Filed: Jan. 3, 1983
(Under 37 CFR 1.47)

[51] Int. Cl.$^4$ .................. H03K 5/00; H03B 19/00
[52] U.S. Cl. ................................ 328/22; 328/25; 328/27; 307/261
[58] Field of Search ............... 328/27, 60, 187, 14, 328/22, 166, 13, 25, 21, 142, 143; 307/261, 269, 228, 512, 260, 262; 340/347 M; 364/721

[56] References Cited

U.S. PATENT DOCUMENTS

| | | | |
|---|---|---|---|
| 3,512,092 | 5/1970 | Thurnell | 328/22 |
| 3,649,923 | 3/1972 | Venturini | 307/261 |
| 3,657,657 | 4/1972 | Jefferson | 328/27 |
| 3,671,871 | 6/1972 | Malm | 328/22 |
| 3,873,928 | 3/1975 | Lafuze | 328/27 |
| 3,995,222 | 11/1976 | Mitarai | 328/13 |
| 4,152,698 | 5/1979 | van Deusen | 340/347 M |
| 4,328,554 | 5/1982 | Mantione | 328/14 |

Primary Examiner—Stanley D. Miller
Assistant Examiner—T. P. Callahan
Attorney, Agent, or Firm—John J. Simkanich

[57] ABSTRACT

A solid-state, digital logic, sine-cosine generator is provided for use in color television signal generators which contributes little or no phase shift or drift, whereby an input frequency of four times the color burst rate is used, and a first divide by two shift register operates upon that input signal frequency while a second divide by two shift register is used to obtain the proper color burst frequency as well as the 90° relationship for the sine and cosine signals; a series of integrators then converts the digital "square" waves to triangular and then sinusoidal signals.

8 Claims, 2 Drawing Figures

DIGITAL SINE-COSINE GENERATOR

BACKGROUND OF THE INVENTION

This invention relates to solid state logic circuitry and specifically such circuitry for generating a sinusoidal signal of a specific phase and period.

The circuitry used in color television type display apparatus must deal with control equations for driving the color guns according to the following equation:

$$K = \sqrt{(A-B)^2 + (C-D)^2} \sin\left[wt + \tan^{-1}\frac{(A-B)}{(C-D)}\right]$$

Sinusoidal signals must be generated for sine and cosine functions. If these sine and cosine signals drift separately, i.e. have a phase shift, the color for the television will drift, i.e. will be "off".

While the final control signals to the television tube guns are analog signals, these signals need be generated in a circuitry chassis which with present technology is 90 percent or more digital circuitry. Thus the voltage levels, power supplies and other parameters readily available in the television chassis are more suitable for digital circuitry than analog circuitry.

An object of the present invention is to provide a sine-cosine signal generator from digital circuitry.

A second object is to provide such a sine-cosine generator where there is no phase shift between the sine and cosine signals.

A further object is to provide such a sine-cosine generator where there is no drift in the sine and cosine signals regardless of drift in the frequency generator duty cycle driving the generator or regardless of temperature and component variations.

An even further object is to provide such a sine-cosine generator utilizing a minimum of circuitry components whereof the design may be implemented by NMOS large scale integration techniques.

SUMMARY OF THE INVENTION

The objects of this invention are realized by a solid-state, digital logic, sine-cosine generator for a television color gun controller which is implemented in an NMOS large scale integration (L.S.I.) circuit and driven by an oscillator which is set at four times the desired color burst frequency, i.e., the frequency of the sine and cosine signals to be provided by the generator.

The oscillator provided signal, which is a train of digital pulses, is divided by 2 with a first shift register to provide a signal of 50% duty cycle. A second divide by 2 shift register to obtain the proper color burst frequency as well as enabling the generation of a "locked" 90° phase shift signal for the proper sine and cosine signal relationship of two signals generated in parallel.

Parallel integration paths transform the digital 90° phase shifted signals separately and respectively into first triangular wave shaped signals and then sinusoidal signals at the correct color burst frequency, one signal being the sine wave output and another being the cosine wave output and their inverses.

DESCRIPTION OF THE DRAWINGS

The features, advantages and operation of the invention will be better understood from a reading of the following detailed description in connection with the accompanying drawings in which like numerals refer to like elements and in which.

DETAILED DESCRIPTION OF INVENTION

Figure 1:
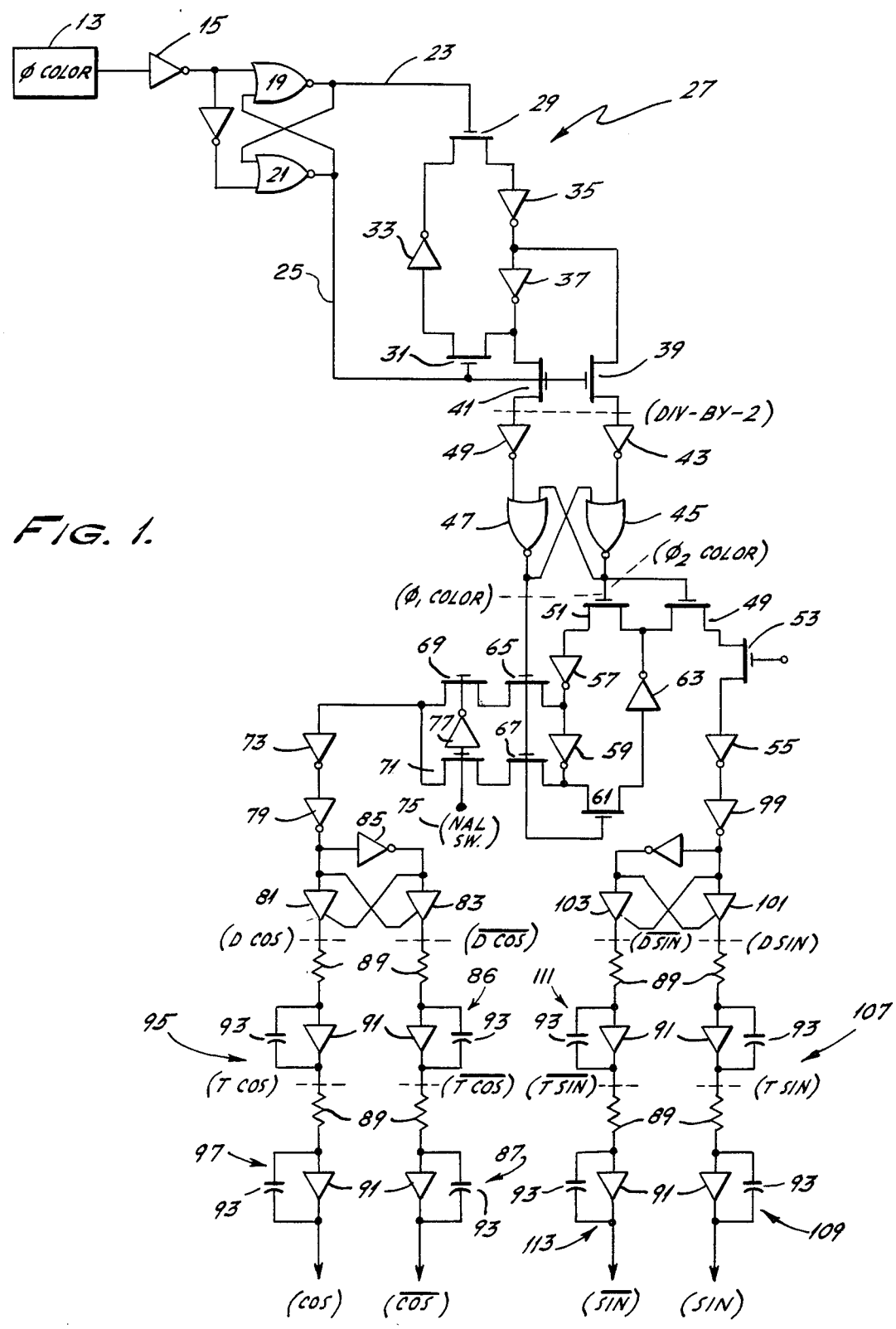
FIG. 1 is a circuit diagram for the sine-cosine generator of the invention.

A solid-state digital logic sine-cosine generator for use in television color gun control circuitry is implemented in discrete components or in NMOS large scale integration (L.S.I.) circuitry, FIG. 1. A pulse train generator includes a crystal oscillator 13 whose output ($\phi$ color) which is four times the color burst frequency is fed through an inverter 15 and a second inverter 17 to a pair of cross tied NOR gates 19, 21 to provide a pulse train frequency 23 and the inverted signal thereof 25. This pair of signals 23, 25 is phase locked and four times the frequency of the desired color burst frequency for the television circuit driven by the invention. These signals are fed to a divide by two shift register 27 comprising a first field effect transistor (FET) 29, a second FET 31 and three inverting gates 33, 35, 37.

The pulse train 23 is fed into the gate pin of the first FET 29 while the inverse signal 25 is fed into the gate pin of the second FET 31. The drain pin of the second FET 31 is connected through the inverter 33 to the source pin of the first FET 29. The drain pin of this first FET 29 is connected through the pair of inverters 35 and 37, connected in series, to the source pin of the second FET 31.

The junction point between the inverters 35 and 37 at the output of the inverter 35 is also connected to the source pin of a third FET 39, while the output of the other inverter 37, which is connected to the source pin of the second FET 31, is also connected to the source pin of a fourth FET 41. The fourth FET 41 has its gate pin connected in common to the gate pin of the second FET 31. The drain pin of the third FET 39 provides the output for the divide by two shift register 27 while the drain pin of the fourth FET 41 provides the complementary or inverse output.

The drain pin of the third FET 39 is connected to the input of an inverter 43 which in turn is connected to an input of a NOR gate 45 which is cross connected with a second NOR gate 47 to phase lock their respective outputs. The other input to the NOR gate 47 is connected through an inverter 49 from the drain pin of the fourth FET 41. The outputs of each of the NOR gates 45, 47 provide pulse train signals that are the inverse of one another, where these signals are square waves in synchronization with one another so that there is no phase shift between the two signals.

The output from the NOR gate 45 is connected to the gate pins of a fifth and sixth FET 49, 51, respectively. The source pin of these fixth and sixth FET's 49, 51 are connected together. The drain pin of the fifth FET 49 is connected to the source pin of a seventh FET 53 whose drain pin is connected to the input of an inverter 55.

The drain pin from the sixth FET 51 is connected through the series connection of inverter 57 and 59 to the source pin of an eighth FET 61. While the source pin of FET 61 is connected to the output of the inverter 59, its drain pin is connected through another inverter 63 to the interconnection of the source pins for the fifth and sixth FET's 49, 51.

The output from the NOR gate 47 is connected to the gate pin of a ninth FET 65 and a tenth FET 67, as well as, the eighth FET 61. The source pin of the ninth FET 65 is connected to the output of the inverter 57 while the source pin of the tenth FET 67 is connected to the output of the inverter 59. The drain pin from the ninth FET 65 is connected to the source pin of an eleventh FET 69, while the drain pin of the tenth FET 67 is connected to the source pin of a twelfth FET 71. The drain pins of the eleventh and twelfth FET's 69, 71 are connected together and to an inverter 73.

A PAL switch 75 is connected to toggle operation when the device is used in conjunction with European TV sets, and is connected to the gate pin of the twelfth FET 71 and through an inverter 77 to the gate pin of the eleventh FET 69.

The inverter 73 is connected in series to another inverter 79 which is in turn connected to a pair of square wave amplifiers 81, 83 connected in cross feed back connection. Inverter 79 is also connected to an inverter 85 which in turn is connected to the square wave amplifier 83.

The output from the amplifier 83 is passed through the series connection of a first integrating circuit 86 and then a second integration circuit 87. Each of the integration circuits 85 and 87 contains a resistor 89, operational amplifier 91 and feedback capacitor 93 connected in the typical manner.

The output from the amplifier 81 is fed through similar third and fourth integration circuits 95, 97, respectively, each comprising the same resistor 89 operational amplifier 91 and capacitor 93 interconnection. The output from the second integration circuit 87 provides the inverse of the cosine signal, an output of the invention; while the output from the fourth integration circuit 97 provides the cosine signal.

Similar circuitry is utilized in the sine wave generating side of the invention. Here, the output from the inverter 55 is fed through another inverter 99 to the input of a pair of cross connected square wave amplifiers 101, 103, with the output of the inverter 99 connected through another inverter 105 to the input of the amplifier 103. The output from amplifier 101 is fed through the series connection of a fifth integrator circuit 107 and a sixth integration circuit 109 to provide the sine wave signal output of the invention. The output of the amplifier 103 is connected through a seventh integration circuit 111 and an eighth integration circuit 113 to provide the inverse sine wave signal output of the invention. Each of the integration circuits, 107, 109, 111, 113 is made up of the resistor 89 operational amplifier 91 and capacitor 93 components of the other integration circuits.

Figure 2:
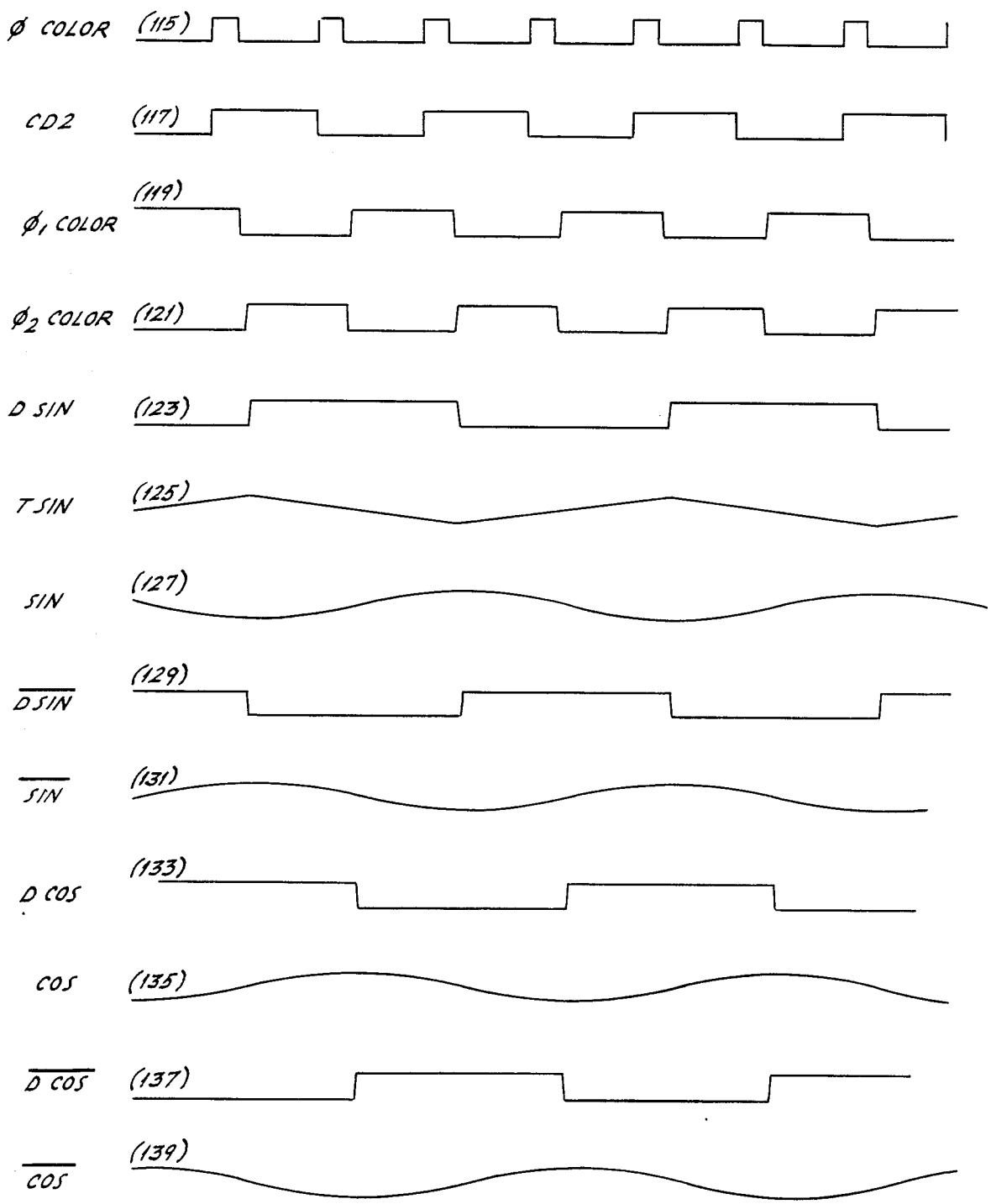
FIG. 2 is a timing diagram for the operation of the circuit of FIG. 1.

The operation of the invention of the circuit FIG. 1 is illustrated by the timing diagram shown as FIG. 2 which has the signal representations numbered 115 through 139 with odd numbers. The oscillator 13 is set to operate at 14.31818 megahertz. This frequency is represented by the symbol "$\phi$ color," which is four times the color burst frequency needed in the television display circuit and is represented by the pulse train 115 of FIG. 2.

The drain pins of the third and fourth FET's 39, 41 each provide the signal 117 which is a square wave at one half the frequency provided by the oscillator 13. The cross feedback connected NOR gate pair 45, 47 provides, on its respective outputs, square wave signals illustrated by lines 121 and 119 respectively, of FIG. 2 which are in time synchronization with one another and will remain that way regardless of temperature, component and other variations in the circuit. The signals are represented as "$\phi_2$ color" and "$\phi_1$ color," and are square wave signals at twice the color burst frequency needed in the television circuitry.

The output of the amplifier 101 is a square wave signal which is one half the frequency of the "$\phi_2$ color" frequency. This signal is represented by line 123 of FIG. 2. The output of the amplifier 103 is one half the "$\phi_2$ color" frequency and an inversion of that signal, and is represented by line 129, FIG. 2.

The output from the amplifier 81 is a square wave, line 133, FIG. 2, which is one half the frequency of the "$\phi_1$ color" signal and an inversion of that signal. The output of the amplifier 83 is the inverse of the output of that amplifier 81. The signals appearing at the output of the amplifiers 81, 83, 103 and 101 are then integrated twice to first generate the triangular waves of a shape as illustrated in line 125 of FIG. 2 and then provide the cosine sinusoidal waveform, line 135, FIG. 2, inverse waveform, line 139, FIG. 2, inverse sine waveform, line 131, FIG. 2, and sine waveform, line 127, FIG. 2.

The frequencies of the cosine, inverse cosine, inverse sine and sine wave signals (lines 135, 139, 131, and 127) is one fourth the oscillator frequency 115 and therefore at the color burst frequency needed for the television circuitry. The circuit of the invention provides these signals so that there will be no phase shift between the sine and cosine waveforms regardless of delay times or temperature or doping variation effects upon components; and whereby the duty cycle will not drift and result in any drift in the frequency output of the oscillator 115. As can be seen from the timing diagram FIG. 2, the initial divide by two output, line 117, provides a square wave which will not change as a function of any drift in the pulse width output of the oscillator 115. The concurrent generator of the "$\phi_1$ color" and "$\phi_2$ color" signals, lines 119, 121, respectively, provide a signal which is one half the frequency of the supply oscillator 115. They are inverses of one another. By dividing the signals 119, 121 again, a quarter phase shift trigger point can be established for a second signal which is precisely 90° behind a first signal. This circuitry can be triggered on the falling edge of a pulse so that a sinusoidal signal generation pathway can be created from the "$\phi_2$ color" signal 121 while a cosine signal path way can be created from the "$\phi_1$ color" signal 119. The falling edges of these two pulse trains 121 and 119 are then utilized to generate respective signals 133, 123 which are again one-half the previous frequency; and are square waves, from which through double step integration, respective cosine and sine waves can be generated.

It is the use of a source oscillator which is four times the color burst frequency and then the division to one half that frequency to generate precisely timed synchronized inverse paired signals which leads to a second division by two. This second division by two provides the opportunity for a precise phase locked triggering of the 90° phase shift needed between the sine and cosine signals when implemented with an NMOS logic circuit which triggers on rising edges.

The circuit of this invention strives to maximize circuit operation parameters and to generate true sine-cosine signals out of digital pulses, whereby the sine signals and cosine signals remain at optimum phase relationships over a wide operating range of temperature and other variations affecting components. Variations in electronic circuit component operations are thereby neutralized.

The additional circuitry for parallel inverse signals is used but not necesssarily needed. This is a design choice of the inventor. Therefore, it is considered that the above description should be taken in the illustrative sense and not be read in the limiting sense as many variations can be made in the circuitry without departing from the intent and scope thereof.

What is claimed is:

1. An apparatus to digitally generate sine and cosine signals comprising:

means for providing a train of digital pulses;

first digital divider means for dividing the output of the pulse train providing means by two, said digital divider means output being a first digital square wave pulse train signal at one-half the frequency of its input;

means connected to said digital divider means output for providing a second square wave pulse signal at the frequency of said digital divider means output and a third square wave pulse signal which is the inverse of said second square wave pulse signal and synchronized therewith;

second divider means connected to receive said second square wave signal for dividing it by two to provide a fourth square wave pulse signal which is at one-half the frequency of said second square wave pulse signal and a fifth square wave pulse signal which is at one-half the frequency of said second square wave pulse signal and the inverse of said fourth square wave pulse signal and synchronized therewith;

third divider means connected to receive said third square wave pulse signal for dividing it by two to provide a sixth square wave pulse signal which is at one-half the frequency of said third square wave pulse signal and a seventh square wave pulse signal which is at one-half the frequency of said third square wave pulse signal and the inverse of said sixth square wave pulse signal and synchronized therewith, said second divider means and said third divider means operation being synchronized;

wherein said fourth and fifth square wave pulse signals are displaced in time by one quarter of a period from the sixth and seventh square wave pulse signals, and means connected to receive said fourth, fifth, sixth and seventh square wave pulse signals for integrating each into sinusoidal wave forms.

2. The generator of claim 1 wherein said digital pulse train providing means is an oscillator and wherein said first digital divider means is a first divide-by-2 shift register connected to said oscillator output.

3. The generator of claim 2 wherein said first shift register provides an output and an inverse output, being said second and third square wave pulse signals, respectively.

4. The generator of claim 3 wherein second divider means comprises a second divide-by-2 shift register connected to receive said first shift register output, said second shift register providing an output gated by said first shift register output.

5. The generator of claim 4 wherein said third divider means comprises a third divide-by-2 shift register, said third shift register connected to receive said first shift register inverse output and providing an output gated by said first shift register inverse output whereby said third shift register operation is synchronized to said second shift register operation.

6. The generator of claim 5 also including a first integrating means connected to receive said fourth square wave pulses; a second integrating means connected to receive said fifth square wave pulses; a third integrating means connected to receive said sixth square wave pulses; and a fourth integrating means connected to receive said seventh square wave pulses.

7. The generator of claim 6 wherein each of said first, second, third and fourth integrating means includes:

a first integrator circuit; and a second integrator circuit connected in series with said first integrator circuit;

wherein said first integrating means outputs a cosine wave, said second integrating means outputs the inverse cosine wave, said third integrating means outputs a sine wave and said fourth integrating means outputs the inverse sine wave.

8. The generator of claim 7 wherein said first divider means includes a phase lock loop circuit.

* * * * *

UNITED STATES PATENT AND TRADEMARK OFFICE
CERTIFICATE OF CORRECTION

PATENT NO. : 4,551,682

DATED : Nov. 5, 1985

INVENTOR(S) : A.J. Charpentier, J.W. Redfield and D.W. DiOrio

It is certified that error appears in the above-identified patent and that said Letters Patent is hereby corrected as shown below:

Figure 1 element "75", change "(NAL SW.)" to - - (PAL SW.) - -.

Signed and Sealed this

Fourteenth Day of October, 1986

[SEAL]

*Attest:*

DONALD J. QUIGG

*Attesting Officer*     *Commissioner of Patents and Trademarks*